(12) United States Patent
Yu et al.

(10) Patent No.: US 12,276,876 B2
(45) Date of Patent: Apr. 15, 2025

(54) DISPLAY DEVICE INCLUDING DRIVING MECHANISM

(71) Applicant: WUHAN CHINA STAR OPTOELECTRONICS TECHNOLOGY CO., LTD., Hubei (CN)

(72) Inventors: Shuliang Yu, Hubei (CN); Suimang Song, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/904,728

(22) PCT Filed: Aug. 16, 2022

(86) PCT No.: PCT/CN2022/112644
§ 371 (c)(1),
(2) Date: Aug. 22, 2022

(87) PCT Pub. No.: WO2024/016413
PCT Pub. Date: Jan. 25, 2024

(65) Prior Publication Data
US 2024/0201533 A1    Jun. 20, 2024

(30) Foreign Application Priority Data
Jul. 22, 2022   (CN) .................. 202210873566.X

(51) Int. Cl.
*G02F 1/1333*   (2006.01)
*G02F 1/13357*  (2006.01)
(Continued)

(52) U.S. Cl.
CPC .... *G02F 1/13338* (2013.01); *G02F 1/133314* (2021.01); *G02F 1/133322* (2021.01);
(Continued)

(58) Field of Classification Search
CPC .......... G02F 1/13338; G02F 1/133308; G02F 1/133314; G02F 1/133322;
(Continued)

(56) References Cited

U.S. PATENT DOCUMENTS

| 2010/0002129 A1* | 1/2010 | Zhou ...................... H04N 23/51 348/374 |
| 2020/0186688 A1* | 6/2020 | Chen ...................... H04N 23/54 |
| 2022/0078268 A1* | 3/2022 | Jung ..................... G06F 1/1639 |

FOREIGN PATENT DOCUMENTS

| CN | 108683757 A | 10/2018 |
| CN | 110134459 A | 8/2019 |

(Continued)

OTHER PUBLICATIONS

International Search Report in International application No. PCT/CN2022/112644, mailed on Dec. 29, 2022.
(Continued)

*Primary Examiner* — Paisley L Wilson

(57) ABSTRACT

Disclosed is a display device. The display device includes a display panel having an imaging area and a display area, wherein at least a portion of the display area surrounds the imaging area; and an imaging module located on a non-display side of the display panel and including an imaging element and a driving mechanism, wherein the driving mechanism drives the imaging element to move within an orthographic projection range of the imaging area. The display device of the present disclosure can address the problem that the imaging element is fixedly mounted in a position and the imaging range thereof is not adjustable.

20 Claims, 10 Drawing Sheets

(51) Int. Cl.
   *G02F 1/1339* (2006.01)
   *G06F 1/16* (2006.01)
   *H04M 1/02* (2006.01)
(52) U.S. Cl.
   CPC ...... *G02F 1/133608* (2013.01); *G02F 1/1339* (2013.01); *G06F 1/1686* (2013.01); *H04M 1/0264* (2013.01); *H04M 2250/20* (2013.01)
(58) Field of Classification Search
   CPC ............ G02F 1/133608; G06F 1/1686; H04M 1/0264; H04M 2250/20
   See application file for complete search history.

(56) References Cited

FOREIGN PATENT DOCUMENTS

| | | |
|---|---|---|
| CN | 110138893 A | 8/2019 |
| CN | 110166662 A | 8/2019 |
| CN | 110890023 A | 3/2020 |
| CN | 111477104 A | 7/2020 |
| CN | 111565238 A | 8/2020 |
| CN | 112153287 A | 12/2020 |
| CN | 112951086 A | 6/2021 |
| CN | 113206901 A | 8/2021 |
| CN | 215867890 U | 2/2022 |
| CN | 216354225 U | 4/2022 |
| EP | 1596597 A1 | 11/2005 |
| JP | 2006148393 A | 6/2006 |
| WO | 2020021098 A1 | 1/2020 |

OTHER PUBLICATIONS

Written Opinion of the International Search Authority in International application No. PCT/CN2022/112644, mailed on Dec. 29, 2022.

Chinese Office Action issued in corresponding Chinese Patent Application No. 202210873566.X dated Apr. 6, 2023, pp. 1-7.

* cited by examiner

DISPLAY DEVICE INCLUDING DRIVING MECHANISM

The present application claims priority to the Chinese patent application with Application No. 202210873566.X, filed with the China National Intellectual Property Administration on Jul. 22, 2022, entitled with "Display Device", which is incorporated into the present application by reference in its entire.

TECHNICAL FIELD

The present disclosure relates to the field of display technologies, and in particular to a display device.

BACKGROUND

With the development of the display screen technologies, the research and technology of under-screen camera is also becoming more and more mature. FIG. 1 is a schematic view of an existing under-screen imaging device. In the under-screen imaging device 900 shown in FIG. 1, an under-screen camera 910 is fixed at a position. That is, the position of the camera is not movable. This means that the camera 910 can capture only a picture within a predetermined imaging range. The camera cannot capture images beyond the above predetermined imaging range, resulting in the inability to follow up the user's real images in real time, leading to poor customer experience.

Accordingly, there is an urgent need to design a display device to address the above problems.

Technical Problems

The present disclosure provides a display device to solve the problem that the position of the existing under-screen camera cannot be adjusted.

Technical Solutions

The present disclosure provides a display device comprising:
  a display panel having an imaging area and a display area, wherein at least a part of the display area surrounds the imaging area, and the imaging area has a first imaging area and a second imaging area independent of each other, or a planar shape of the imaging area is continuously annular;
  a backlight module located on a non-light emitting side of the display panel, and an accommodating groove is formed on the backlight module at a position corresponding to the imaging area; and
  an imaging module comprising an imaging element and a driving mechanism, wherein the imaging element is located in the accommodating groove, the driving mechanism is located on a side of the backlight module away from the display panel and drives and connects the imaging element, and the driving mechanism drives the imaging element to move relative to the accommodating groove within an orthographic projection range of the imaging area.

Optionally, in some embodiments of the present disclosure, the backlight module comprises:
  a back plate having a first hollow structure;
  an optical module stacked on a side of the back plate facing the display panel, wherein a second hollow structure is formed on the optical module at a position corresponding to the first hollow structure; and
  a limiting side plate penetrating the first hollow structure and the second hollow structure along a thickness direction of the backlight module, wherein the limiting side plate is disposed along a peripheral edge of the first hollow structure and fixedly connected with the back plate, and the limiting side plate surrounds to form the accommodating groove.

Optionally, in some embodiments of the present disclosure, wherein the backlight module further comprises a limiting element, and the limiting element is located between the optical module and the display panel and spans a side of the limiting side plate away from the back plate.

Optionally, in some embodiments of the present disclosure, the backlight module comprises:
  a back plate having a first hollow structure;
  an optical module stacked on a side of the back plate facing the display panel, wherein a second hollow structure is formed on the optical module at a position corresponding to the first hollow structure, and the accommodating groove is constituted by the second hollow structure and the second hollow structure: and
  a positioning member disposed between the optical module and the display panel and simultaneously contacting the optical module and the display panel, wherein the positioning member is disposed along a peripheral edge of the second hollow structure.

Optionally, in some embodiments of the present disclosure, the first imaging area and the second imaging area are arranged in parallel and spaced from each other, and both of the first imaging area and the second imaging area have a rectangular planar shape.

Optionally, in some embodiments of the present disclosure, the display panel comprises an array substrate, an opposing substrate, a seal ring, a frame, a first liquid crystal layer, and a second liquid crystal layer, wherein:
  the opposing substrate is disposed opposite to the array substrate;
  the frame is disposed along a peripheral edge of the array substrate, and seals and connects the array substrate and the opposing substrate;
  the seal ring is disposed along a peripheral edge of the imaging area and located between the array substrate and the opposing substrate: the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area;
  the first liquid crystal layer is filled in the first sealed space; and
  the second liquid crystal layer is filled in the second sealed space.

Optionally, in some embodiments of the present disclosure, the display panel comprises an array substrate, an opposing substrate, a seal ring, a frame, and a first liquid crystal layer, wherein:
  the opposing substrate is disposed opposite to the array substrate;
  the frame is disposed along a peripheral edge of the display panel, and seals and connects the array substrate and the opposing substrate;
  the seal ring is disposed along a peripheral edge of the imaging area and located between the array substrate and the opposing substrate: the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area; and the first liquid crystal layer is filled in the first sealed space.

Optionally, in some embodiments of the present disclosure, the display device further comprises a rear housing disposed on a side of the imaging module away from the display panel:
  the driving mechanism comprises a motor, a first holder, and a second holder, wherein:
  the motor is fixedly mounted via the first holder on a side of the backlight module away from the display panel or on the rear housing: and
  the second holder is mounted on the motor, the imaging element is mounted on the second holder, and the motor drives the imaging element to move in the accommodating groove via the second holder.

Optionally, in some embodiments of the present disclosure, the display device comprises an imaging control unit, wherein the imaging control unit is connected to the imaging element and the driving mechanism, the imaging control unit is capable of controlling the imaging element to sense an external environment of the display device, and transmitting a control signal to the driving mechanism in accordance with the sensed signal from the imaging element, and the driving mechanism is capable of adjusting a position of the imaging element in accordance with the control signal.

Accordingly, the present disclosure provides a display device comprising:
  a display panel having an imaging area and a display area, wherein at least a part of the display area surrounds the imaging area; and
  an imaging module located on a non-display side of the display panel and including an imaging element and a driving mechanism, wherein the driving mechanism drives the imaging element to move within an orthographic projection range of the imaging area.

Optionally, in some embodiments of the present disclosure, the display device further comprises a backlight module located on the non-display side of the display panel, and an accommodating groove is formed on the backlight module at a position corresponding to the imaging area and opens to the imaging module; and
  the imaging module is disposed so that all or a part of the imaging element is located in the accommodating groove, and the imaging module is capable of driving the imaging element to move relative to the accommodating groove.

Optionally, in some embodiments of the present disclosure, the backlight module comprises:
  a back plate having a first hollowed-out structure;
  an optical module stacked on a side of the back plate facing the display panel, wherein a second hollow structure is formed on the optical module at a position corresponding to the first hollow structure; and
  a limiting side plate penetrating the first hollow structure and the second hollow structure along a thickness direction of the backlight module, wherein the limiting side plate is disposed along a peripheral edge of the first hollow structure and fixedly connected with the back plate, and the limiting side plate surrounds to form the accommodating groove.

Optionally, in some embodiments of the present disclosure, the backlight module further comprises a limiting element, wherein the limiting element is located between the optical module and the display panel and spans a side of the limiting side plate away from the back plate.

Optionally, in some embodiments of the present disclosure, the backlight module comprises:
  a back plate having a first hollow structure;
  an optical module stacked on a side of the back plate facing the display panel, wherein a second hollow structure is formed on the optical module at a position corresponding to the first hollow structure, and the accommodating groove is constituted by the second hollow structure and the second hollow structure;
  a positioning member disposed between the optical module and the display panel and simultaneously contacting the optical module and the display panel, wherein the positioning member is disposed along a peripheral edge of the second hollow structure.

Optionally, in some embodiments of the present disclosure, the imaging area has a first imaging area and a second imaging area parallel to and spaced from each other, wherein both of the first imaging area and the second imaging area have a rectangular planar shape: or
  a planar shape of the imaging area is continuously annular.

Optionally, in some embodiments of the present disclosure, the display panel comprises an array substrate, an opposing substrate, a seal ring, a frame, a first liquid crystal layer, and a second liquid crystal layer, wherein:
  the opposing substrate is disposed opposite to the array substrate;
  the frame is disposed along a peripheral edge of the array substrate, and seals and connects the array substrate and the opposing substrate;
  the seal ring is disposed along a peripheral edge of the imaging area and located between the array substrate and the opposing substrate: the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area;
  the first liquid crystal layer is filled in the first sealed space; and
  the second liquid crystal layer is filled in the second sealed space.

Optionally, in some embodiments of the present disclosure, the display panel comprises an array substrate, an opposing substrate, a seal ring, a frame, and a first liquid crystal layer, wherein:
  the opposing substrate is disposed opposite to the array substrate;
  the frame is disposed along a peripheral edge of the display panel, and seals and connects the array substrate and the opposing substrate;
  the seal ring is disposed along a peripheral edge of the imaging area and located between the array substrate and the opposing substrate: the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area; and the first liquid crystal layer is filled in the first sealed space.

Optionally, in some embodiments of the present disclosure, the display device further comprises a rear housing disposed on a side of the imaging module away from the display panel:

the driving mechanism comprises a motor, a first holder, and a second holder, wherein:

the motor is fixedly mounted via the first holder on a side of the backlight module away from the display panel or on the rear housing: and the second holder is mounted on the motor, the imaging element is mounted on the second holder, and the motor drives the imaging element to move in the accommodating groove via the second holder.

Optionally, in some embodiments of the present disclosure, the display device comprises an imaging control unit, wherein the imaging control unit is connected to the imaging element and the driving mechanism, the imaging control unit is capable of controlling the imaging element to sense an external environment of the display device, and transmitting a control signal to the driving mechanism in accordance with the sensed signal from the imaging element, and the driving mechanism is capable of adjusting a position of the imaging element in accordance with the control signal.

Beneficial Effects

Compared with the prior art, in the display device according to the present invention, the imaging area is disposed on the display panel, and the imaging element is driven along a target trajectory corresponding to the imaging area by the driving mechanism, so that the problem that the imaging element is fixedly mounted in a position and the imaging range thereof is not adjustable can be solved.

DETAILED DESCRIPTION THE EMBODIMENTS OF THE INVENTION

Embodiments of the present disclosure provide a display device. Embodiments are described below in detail, respectively. It is to be noted that the order of description of the following embodiments is not intended to limit the preferred order of embodiments.

Figure 1:
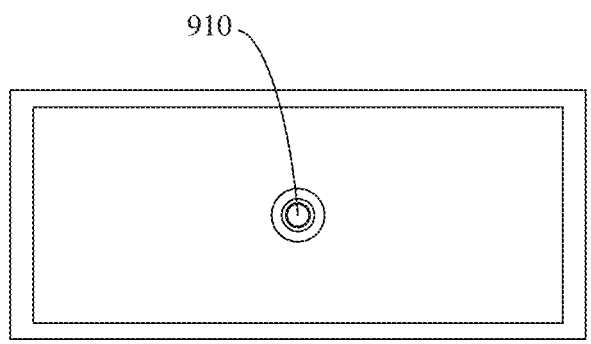
FIG. 1 is a schematic view of an existing under-screen imaging device.
Figure 2:
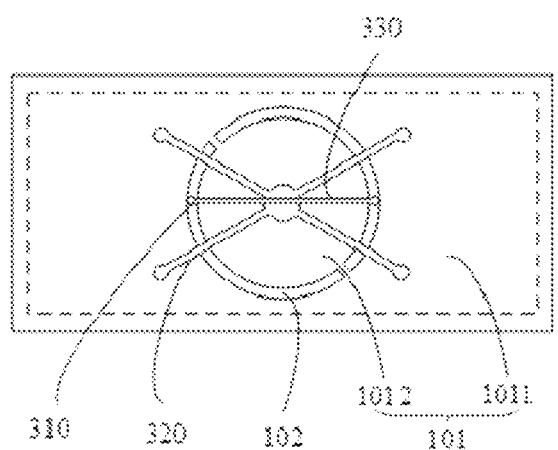
FIG. 2 is a plan structural view of a first embodiment of a display device according to an embodiment of the present disclosure.
Figure 3:
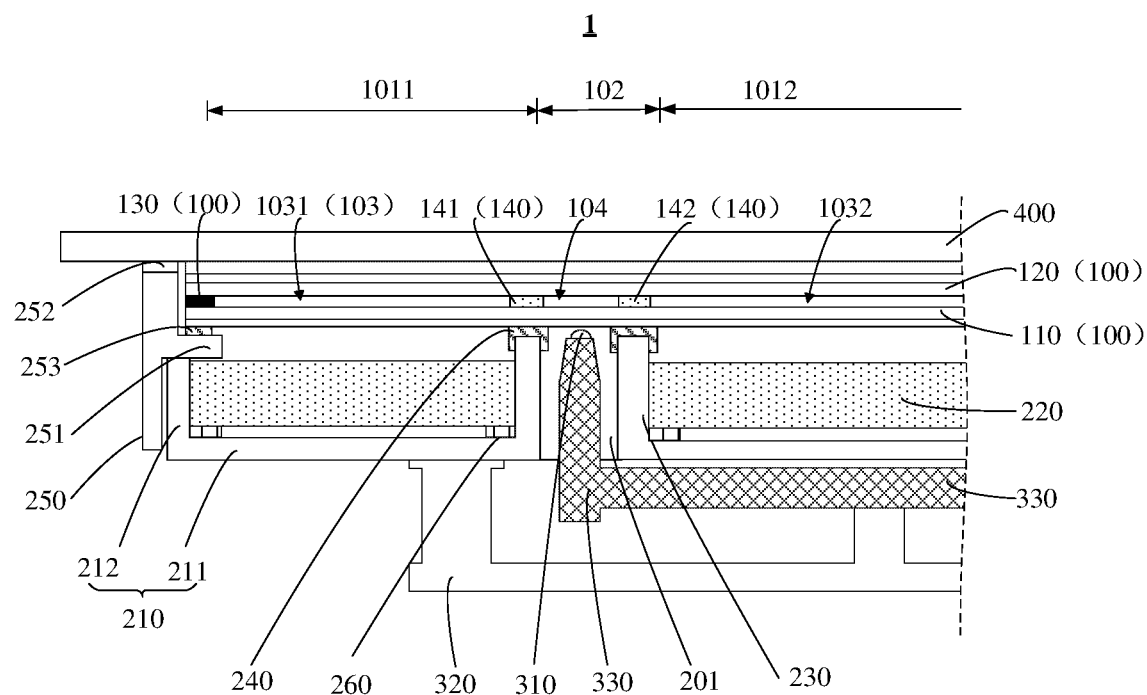
FIG. 3 is a cross-sectional view of a first embodiment of a display device according to an embodiment of the present disclosure.

As shown in FIGS. 2 and 3, an embodiment of the present disclosure provides a display device 1, including a display panel 100 and an imaging module 300. The display panel 100 has an imaging area 102 and a display area 101 at least partially surrounding the imaging area 102. The imaging module 300 is located on a non-display side of the display panel 100. The imaging module 300 includes an imaging element 310, and a driving mechanism that drives the imaging element 310 to move within an orthographic projection range of the imaging area 102.

In the display device 1 of the present disclosure, the imaging area 102 is disposed on the display panel 100, and the imaging element 310 is driven to move back and forth within the orthographic projection range of the imaging area 102 by means of the driving mechanism. By this configuration, it is possible to address the problem that the imaging element 310 is fixedly mounted in a position and the imaging range thereof is not adjustable. It is apparent that the display device 1 of the present disclosure can obtain an imaging range with a wider field of view compared with the conventional imaging module with a single fixed point.

Further, the display panel 100 may be a liquid crystal display panel 100. Referring to FIG. 3, the display panel 100 includes an array substrate 110, an opposing substrate 120, a frame 130, a seal ring 140, and a first liquid crystal layer. The array substrate 110 is disposed opposite to the opposing substrate 120. The seal ring 140 is located between the array substrate 110 and the opposing substrate 120 for sealing and connecting the array substrate 110 and the opposing substrate 120. The seal ring 140 is disposed along a peripheral edge of the imaging area 102. The seal ring 140, the array substrate 110 and the opposing substrate 120 surround to form a second sealed space 104 corresponding to the imaging area 102. The frame 130 surrounds a periphery of the seal ring 140, and seals and connects the array substrate 110 and the opposing substrate 120. The frame 130, the seal ring 140, the opposing substrate 120 and the array substrate 110 surround to form a first sealed space 103. The first sealed space corresponds to the display area 101, and the first liquid crystal layer is filled in the first sealed space 103.

The imaging area 102 is configured as a display imaging area or a light-transmitting display area. That is, the imaging area 102 has a light transmission performance and a display function. In this way, when the imaging area 102 is in a display state, the imaging area 102 and the display area 101 form a continuous display functional area to improve the aesthetics and integrity of the display panel 100 and improve the user experience.

Figure 6:
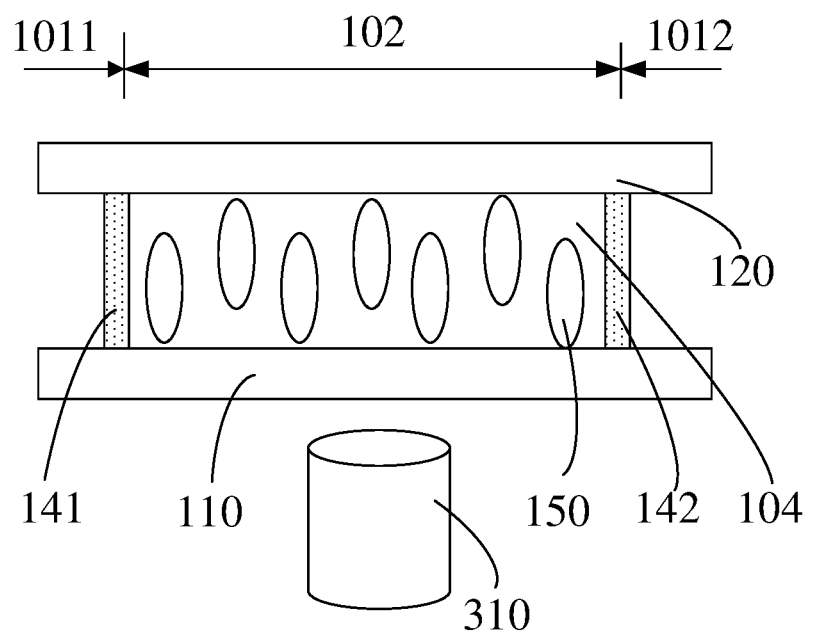
FIG. 6 is a cross-sectional view of an imaging area of the display panel of FIG. 5, mainly showing a film layer structure of the display panel in the imaging area.

Referring to FIG. 6, in order to implement the display function of the imaging area 102, the display panel 100 includes a second liquid crystal layer 150 filled in the second sealed space 104. In a specific implementation, it is possible to control the deflection state and deflection angle of liquid crystal molecules of the second liquid crystal layer 150 in the imaging area 102, so as to switch the imaging function and the display function.

In a specific implementation, the second liquid crystal layer 150 may have the same type of liquid crystal molecules as the first liquid crystal layer, thereby ensuring a higher consistency in display effect of the imaging area 102 and the display area 101. In other embodiments, however, the second liquid crystal layer may be different from the second liquid crystal layer, in order to improve the light capturing performance of the imaging area 102.

Further, a planar shape of the imaging area 102 is a continuous, closed annular shape.

Figure 5:
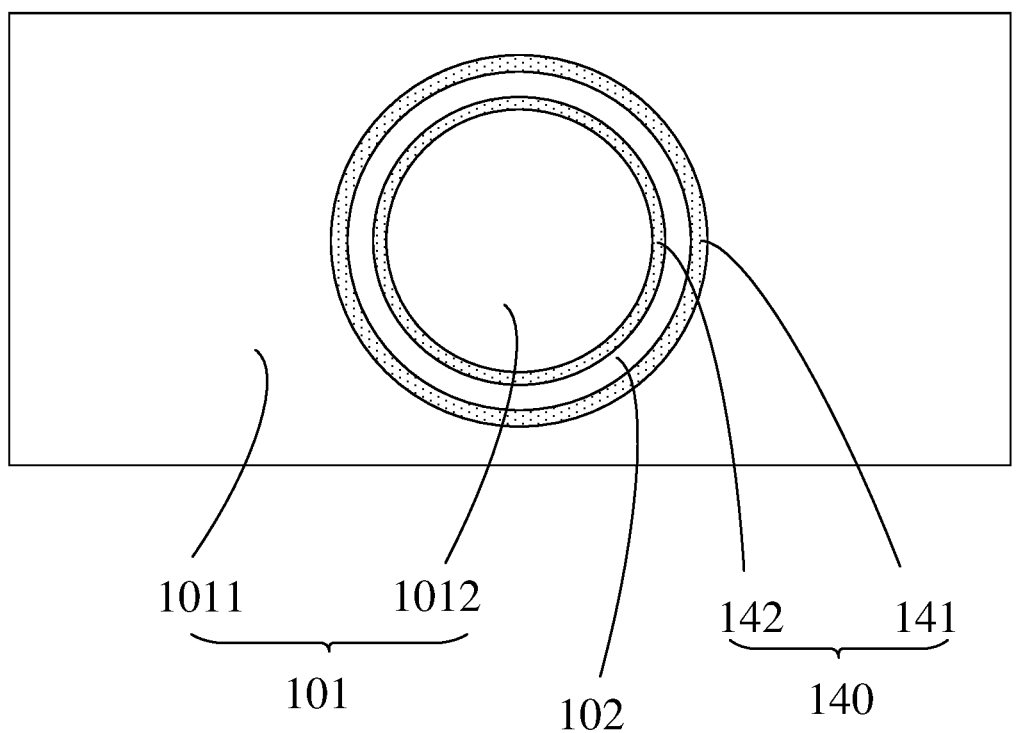
FIG. 5 is a plan view of the display panel of FIG. 4.

Referring to FIGS. 5 and 6, more specifically, the planar shape of the imaging area 102 is circular loop shape. In this case, the first sealed space 103 is divided into a first sub-sealed space 1031 and a second sub-sealed space 1032, which are independent of each other, by the imaging area 102. Accordingly, the display area 101 is divided into a first display area 1011 and a second display area 1012, which are independent of each other, by the imaging area 102. The first display area 1011 surrounds the periphery of the imaging area 102 and is adjacent to the imaging area 102. The imaging area 102 surrounds the periphery of the second display area 1012 and is adjacent to the second display area 1012. In brief, the second display area 1012, the imaging area 102, and the first display area 1011 are successively connected from the center of the display panel 100 to the edge of the display panel 100.

Based on the above embodiment, the peripheral edge of the imaging area 102 includes a first edge located at the intersection of the imaging area 102 and the first display area 1011, and a second edge located at the intersection of the imaging area 102 and the second display area 101. Both of the first edge and the second edge are circular, and the first edge surrounds a periphery of the second edge.

Figure 8:
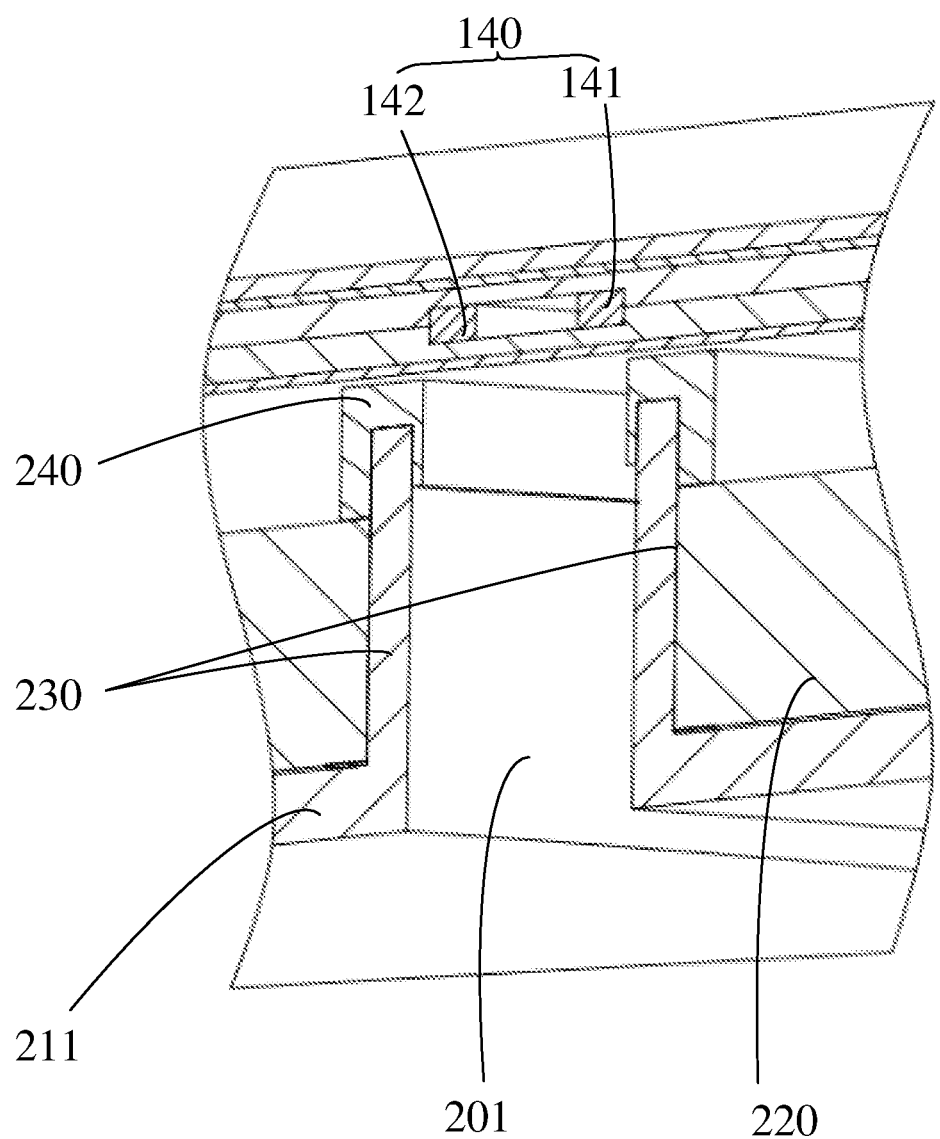
FIG. 8 is a cross-sectional view of the backlight module of FIG. 7.

Referring to FIGS. 6 and 8, accordingly, in order to separate the imaging area 102 from the first display area 1011 and the second display area 1012, the seal ring 140 includes a first seal ring 141 and a second seal ring 142. The first seal ring 141 is disposed along the first edge. The first seal ring 141 seals and connects the array substrate 110 and the opposing substrate 120, so as to separate the first sub-sealed space 1031 from the second sealed space 104. That is, the first seal ring 141 is capable of separating the first liquid crystal layer of the first display area 1011 from the second liquid crystal layer 150 of the imaging area 102. The second seal ring 142 is disposed along the second edge. The first seal ring 141 seals and connects the array substrate 110 and the opposing substrate 120, so as to separate the second sub-sealed space 1032 from the second sealed space 104. That is, the second seal ring 142 is capable of separating the first liquid crystal layer of the second display area 1012 from the second liquid crystal layer of the imaging area 102.

In a specific implementation, the opposing substrate may be a color film substrate. The seal ring 140 may be an epoxy ring.

The case where the display panel 100 is a liquid crystal display panel is illustrated above. However, it is to be noted that the implementation of the display panel 100 of the present disclosure is not limited thereto. For example, in other embodiments, the display panel 100 may be an organic light-emitting diode (OLED) display panel or a quantum dot light emitting diode (QLED) display panel.

Based on the above embodiment, the display device 1 further includes a backlight module 200. The backlight module 200 is disposed between the display panel 100 and the imaging module 300. The backlight module 200 serves to provide backlight to the display panel 100 to meet the light-emitting and display requirements of the display panel 100.

Further, an accommodating groove 201 is formed in the backlight module 200 corresponding to the imaging area 102 and opening to the imaging module 300. An orthographic projection of the accommodating groove 201 on the display panel 100 corresponds to the imaging area 102. The accommodating groove 201 serves to avoid and hold the imaging element 310. It is to be understood that the accommodating groove 201 also meets the requirement for movement of the imaging element 310 along a target trajectory.

Illustratively, the backlight module 200 includes a back plate 210, an optical module 220, and a limiting side plate 230. A first hollow structure is disposed on the back plate 210 corresponding to the imaging area 102. The optical module 220 is stacked on a side of the back plate 210 facing the display panel 100. A second hollow structure penetrating through the thickness of the optical module 220 is formed on the optical module 220 corresponding to the first hollow structure. The limiting side plate 230 is disposed along the thickness direction of the backlight module 200 through the first hollow structure and the second hollow structure. The limiting side plate 230 is connected to the back plate 210, and disposed along a peripheral edge of the first hollow structure. The limiting side plates 230 surround to form the accommodating groove 201.

Referring to FIG. 3, the back plate 210 is basin-shaped, and has an opening facing the display panel 100. The back plate 210 includes a back plate body 211 and a back plate side wall 212. The back plate body 211 is disposed substantially parallel to the display panel 100. The back plate side wall 212 surrounds a peripheral edge of the back plate body 211, and is perpendicular to and connected to the peripheral edge of the back plate body 211. In this case, the back plate body 211 and the back plate side wall 212 surround to form an accommodating space for accommodating the optical module 220. In a specific implementation, the back plate 210 is an integrated molding member. That is, the back plate body 211 and the back plate side wall 212 are integrally formed by stamping, stretching, bending, or other manufacturing processes. For example, the back panel side wall 212 may be obtained by bending peripheral edges of the back panel body 211 vertically toward the display panel 100. Preferably, the material of the back plate 210 is sheet metal.

It can be seen from the above embodiment in which the planar shape of the imaging area 102 is a circular loop shape, that the first hollow structure is disposed on the back plate body 211, and that the planar extension of the first hollow structure is generally a circular loop shape. Further, the back plate body 211 is divided into two portions, respectively as a first portion corresponding to the first display area 1011 and a second portion corresponding to the second display area 1012, by the first hollow structure. The first portion surrounds the outside of the first hollow structure and the second portion is located inside the first hollow structure. Accordingly, the accommodating space is divided into a first accommodating space corresponding to the first display area 1011 and a second accommodating space corresponding to the second display area 1012, by the limiting side plate 230.

Figure 4:
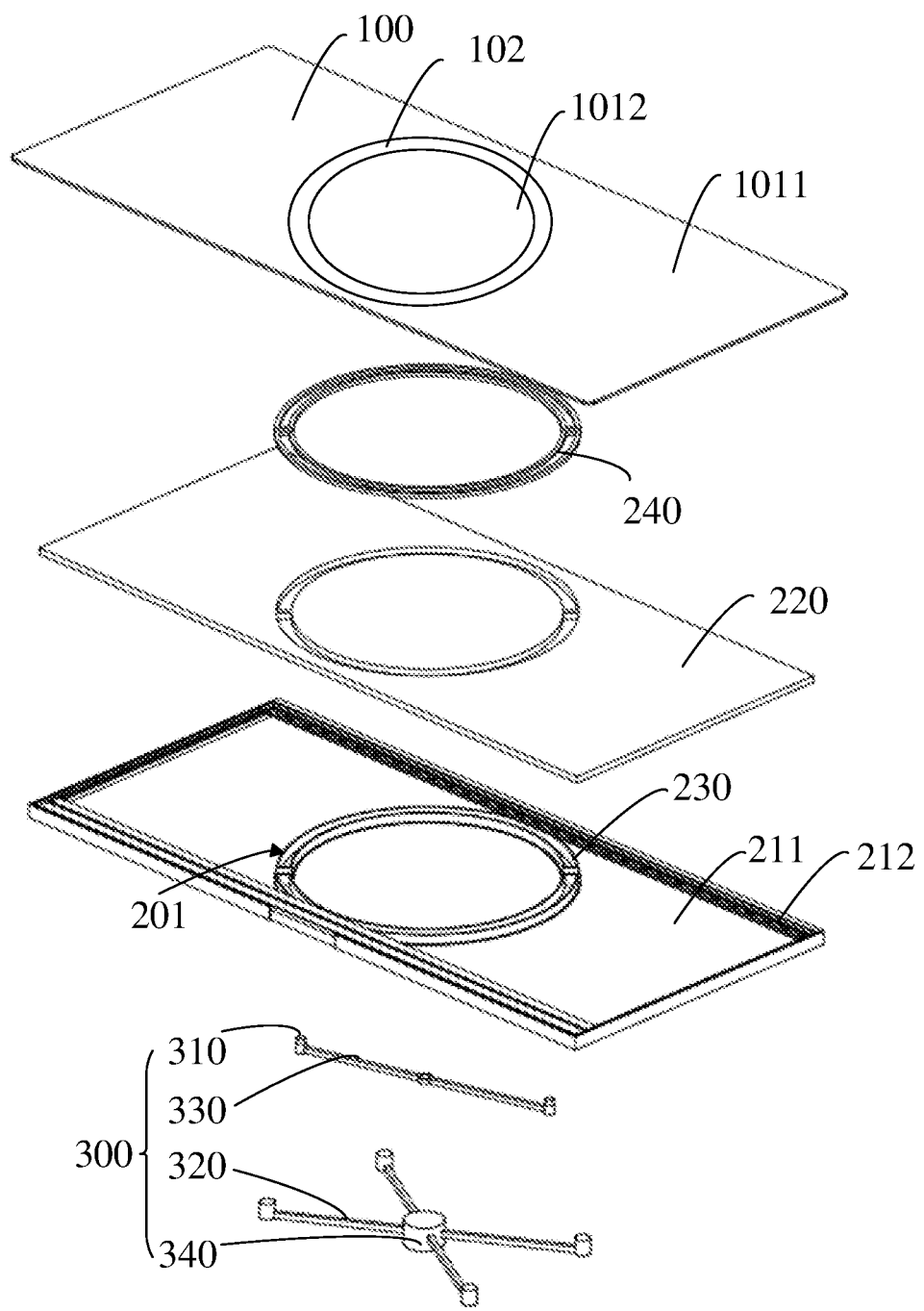
FIG. 4 is an exploded view of a first embodiment of a display device according to an embodiment of the present disclosure.
Figure 7:
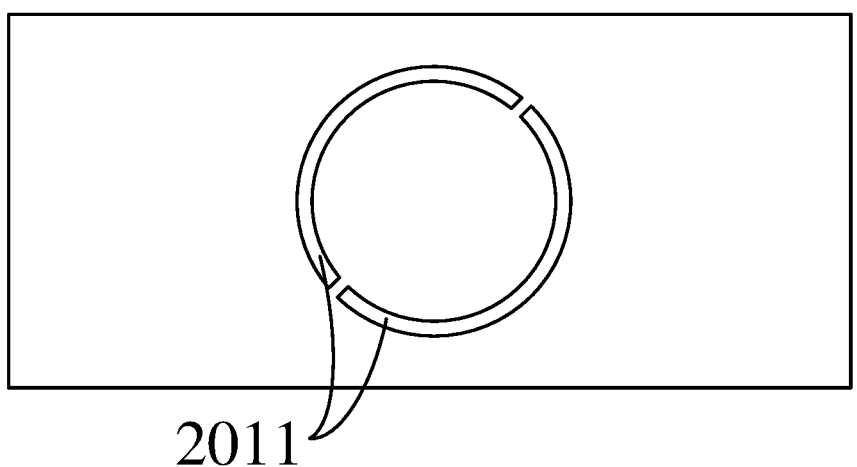
FIG. 7 is a plan view of a backlight module of FIG. 4.

Referring to FIGS. 4 and 7, the accommodating groove 201 includes two semi-annular grooves 2011 independent of each other. The two semi-annular grooves 2011 are spaced along their circumferential direction. That is, the two semi-annular grooves 2011 are not in communication with each other. In this case, viewing from a plane parallel to the display panel 100, the plane pattern of the limiting side plate 230 has two semi-annular holes independent of each other, which are spaced along the circumferential direction thereof. That is, the two semi-annular holes are not in communication with each other.

The limiting side plate 230 has opposite first and second sides in the thickness direction of the backlight module 200. The first side extends along the edge of the first hollow structure on the back plate body 211, and is perpendicular to and connected to the back plate body 211. The second side extends to a position between the optical module 220 and the array substrate 110 through the first hollow structure and the second hollow structure.

In a specific implementation, the limiting side plate 230 is integrally formed with the back plate 210. Specifically, the limiting side plate 230 may be obtained by vertically bending the back plate body 211 along the peripheral edge of the first hollow structure.

It is to be understood that the planar shape of the first hollow structure is substantially geometrically similar to the planar shape of the accommodating groove 201. That is, the first hollow structure includes two semi-annular holes arranged at intervals along the circumferential direction thereof, that is, the two semi-annular holes are not in communication with each other. In this manner, the first portion and the second portion of the back plate body 211 are connected to each other so as to ensure the integrity of the back plate body 211 without additional fixing means.

In a specific implementation, the optical module 220 includes a plurality of optical functional layers stacked in the thickness direction of the optical module 220. The optical functional layers comprises a light-guiding layer or a diffusion layer, and the like.

In the present embodiment, the second hollow structure is arranged in a manner substantially geometrically similar to the first hollow structure. In this case, the optical module 220 is divided by the second hollow structure into two portions respectively corresponding to the first display area 1011 and the second display area 1012, and the two portions are connected to each other. However, it is to be noted that the specific embodiments of the first hollow structure and the second hollow structure in the present disclosure are not limited thereto.

Further, the optical module 220 has opposing first and second surfaces in the thickness direction thereof. The first surface is adhered and fixed to a surface of the back plate body 211 facing the display panel 100. In order to achieve the adhesion and fixing between the optical module 220 and the back plate 210, the backlight module 200 includes an adhesive layer 260. Specifically, the peripheral edge of the first surface and the peripheral edge of the first hollow structure are adhered to the surface of the back plate body 211 facing the display panel 100 by the adhesive layer 260. In a specific implementation, the adhesive layer 260 has two portions, one of which extends along the peripheral edge of the first surface and the other extends along the edge of the second hollow structure.

In order to achieve the fixing of the optical module 220 near the second hollow structure, the backlight module 200 further includes a limiting element 240. The limiting element 240 is positioned between the optical module 220 and the display panel 100, and spans a side of the limiting side plate 230 away from the back plate 210 (i.e., a second side of the limiting side plate 230).

In the present embodiment, the limiting element 240 extends along the circumferential direction of the limiting side plate 230. Viewing from a plane of the display panel 100, the planar shape of the limiting element 240 coincides with the planar shape of the limiting side plate 230.

In a specific implementation, the material of the limiting element 240 may be foam or TPU soft glue. In addition to fixing the optical module 220 to prevent the optical module 220 from warping, the limiting element 240 functions to support the display panel 100 to prevent the central region of the display panel 100 from being depressed downward. In addition, the limiting element 240 may be used to protect the imaging element 310 from a collision between the imaging element 310 and the side wall of the accommodating groove 201 (i.e., the limiting side plate 230), thereby protecting the imaging element 310.

In a preferred embodiment, referring to FIG. 3, viewing from a cross-sectional structure, a cross-sectional shape of the limiting element 240 is U-shaped. In a specific implementation, the outer bottom surface of the limiting element 240 abuts against the array substrate 110. A side wall of the limiting element 240 facing the accommodating space is used to limit the optical module 220, and a side wall of the limiting element 240 facing the accommodating groove is used to provide a buffering effect for the imaging element 310.

It is to be understood that the backlight module 200 includes a backlight, which is used for providing backlight for displaying or lighting. In a specific implementation, the backlight may be configured in the form of a side backlight or a direct backlight, which is not specifically limited in the present disclosure. Further, the backlight may be Mini LED or Micro LED.

In a specific implementation, the backlight module 200 further includes a support bracket 250 that surrounds the periphery of the back plate 210 (specifically, the periphery of the back plate side wall 212). A limiting portion 251 is formed on the inner side wall of the support bracket 250 and protrudes toward the center of the support bracket 250. The limiting portion 251 is engaged on an end of the back plate side wall 212 away from the back plate body 211 (specifically, the end of the back plate side wall 212 close to the display panel 100), and protrudes into the accommodating space of the back plate 210, thereby limiting the optical module 220 at the edge of the second surface.

The implementation of the backlight module 200 including the limiting side plate 230 and the limiting member 240 is described above. However, it is to be noted that the specific implementation of the backlight module 200 in the present disclosure is not limited thereto. For example, in other embodiments of the present disclosure, the backlight module 200 does not have the limiting side plate 230 and the limit member 240. In this case, the second hollow structure and the second hollow structure constitute the accommodating groove 201. Further, in order to achieve fixing of the optical module 220 near the second hollow structure, the backlight module 200 includes a positioning member. The positioning member is positioned between the optical module 220 and the display panel 100 and simultaneously abuts against the optical module 220 and the display panel 100. The positioning member is disposed along the peripheral edge of the second hollow structure. Thus, the positioning member can fix the optical module 220, prevent the optical module 220 from being warping, support the display panel 100, and prevent the central region of the display panel 100 from being depressed downward. In a specific implementation, the material of the positioning member may be foam or TPU soft glue.

Referring to FIG. 3, the display device 1 further includes a cover 400 provided on a light emitting side of the display panel 100, so as to protect the display panel 100.

In order to achieve a fixed installation between the cover 400 and the support bracket 250, a fixing adhesive tape 252 is disposed on an end of the support bracket 250 facing the display panel 100. The fixing adhesive tape 252 extends along the circumferential direction of the support bracket 250. The edge of the cover 400 is fixedly mounted on the support bracket 250 by the fixing adhesive tape 252.

The central region of the cover 400 is also attached to a side of the opposing substrate 120 away from the array substrate 110. In order to ensure a supporting effect on the display panel 100, a buffering member 253 for contacting and supporting the array substrate 110 of the display panel 100 is disposed on a surface of the limiting portion 251 away from the optical module 220.

In a specific implementation, the display device 1 further includes a rear housing disposed on a side of the backlight module 200 away from the display panel 100.

Figure 9:
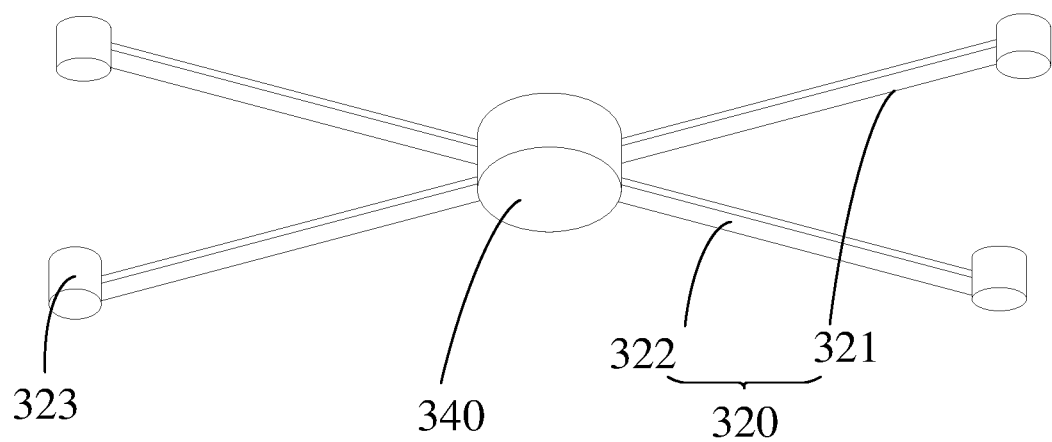
FIG. 9 is a schematic view of a first holder of FIG. 4.
Figure 10:
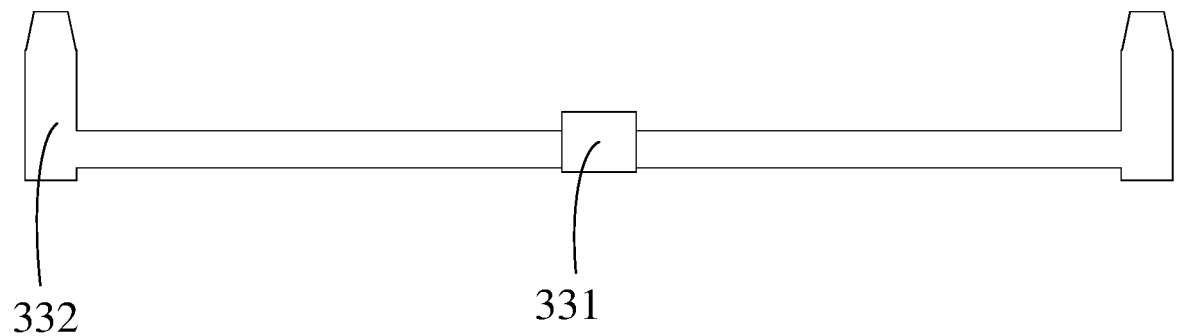
FIG. 10 is a schematic view of a second holder of FIG. 4.

Referring to FIGS. 9 and 10, the imaging module 300 is located between the back plate 210 and the rear housing, and includes a driving mechanism and an imaging element 310. The imaging module 300 is disposed so that a part or all of the imaging element 310 is located in the accommodating groove 201, and the imaging module 300 can drive the imaging element 310 to move relative to the accommodating groove 201. In other words, the imaging element 310 is disposed in the accommodating groove 201 in such a manner that the imaging element 310 is movable relative to the accommodating groove 201. The driving mechanism is connected to the imaging element 310 so as to drive the imaging element 310 to move in the accommodating groove 201.

In one embodiment, the driving mechanism includes a first holder 320, a second holder 330, and a motor 340. The first holder 320 is mounted on the back side of the back plate 210 (i.e., the side of the back plate 210 away from the optical module 220), or fixedly mounted on a side of the rear housing facing the backlight module 200.

Referring to FIG. 9, the first holder 320 includes two intersected support plates, namely, a first support plate 321 and a second support plate 322. With this arrangement, it is possible to reduce the weight of the first holder 320 while ensuring the mounting stability of the motor 340, thereby facilitating the reduction of weight of the display device 1.

Further, the motor 340 is mounted at the intersection of the first support plate 321 and the second support plate 322. Fixing seats 323 are disposed on two ends of the first support plate 321 and two ends of the second support plate 322. The first holder 320 is mounted on the back plate 210 or the rear housing by a plurality of the fixing seats 323. Preferably, the first holder 320 is cross-shaped.

It is to be noted that the present disclosure does not essentially limit the implementation of the first holder 320. In other embodiments, the number of the support plates may be increased to improve support stability.

Referring to FIG. 10, the second holder 330 is generally linear shape. A connecting portion 331 is disposed at a central position of the second holder 330 to enable mounting of the second holder 330 on the motor 340. Mounting portions 332 are respectively disposed at two ends of the second holder 330, and each of the mounting portions 332 is used to mount the imaging element 310.

In a specific implementation, the second holder 330 is mounted on the motor 340 by the connecting portion 331. In this case, all of the mounting portions 332 correspond to the imaging area 102, and at least a part of each of the mounting portions 332 is located in the accommodating groove 201, so as to ensure that the imaging element 310 is located in the accommodating groove 201. In a preferred embodiment, the mounting portions 332 are vertically mounted on the second holder 330.

Referring to FIG. 2, the imaging module 300 includes two imaging elements 310, which are respectively mounted on two of the mounting portions 332. It is apparent that after assembly, the two imaging elements 310 are respectively located at different circumferential positions of the imaging area 102. In this case, the target trajectories of the two imaging elements 310 are arc lines. It is also to be noted that the number of the imaging elements 310 is not limited in the present disclosure. In a specific implementation, the number of the imaging elements 310 may be increased or decreased depending on a specific use scene. For example, if the display panel 100 is a large-sized display panel, such as 23.6 inches or 48 inches, the number of the imaging elements 310 may be increased.

It is also to be noted that the embodiment of the second holder 330 is not limited in the present disclosure.

The display device 1 includes an imaging control unit configured to connect the imaging element 310 and the driving mechanism. The imaging control unit can control the imaging element 310 to sense the external environment of the display device 1, and transmit a control signal to the driving mechanism in accordance with the sensed signal from the imaging element 310. The driving mechanism can adjust the position of the imaging element 310 in accordance with the control signal. In this way, the imaging range of the imaging element 310 can be increased, thereby achieving automatic adjustment of the position of the imaging element 310, and improving the use experience of the display device 1.

Referring to FIG. 2, in the present embodiment, the motor 340 drives rotation of the imaging element 310 in the accommodating groove 201, by driving rotation of the second holder 330.

In a specific use, the display device 1 may be used in a vehicle-mounted screen, which can adapt to a more complex use environment (without restricting the height of a human and the height of a vehicle or the like). The imaging element 310 may be automatically adjusted to capture and recognize human face, so that a driver can have a more flexible operation and safer driving.

Figure 11:
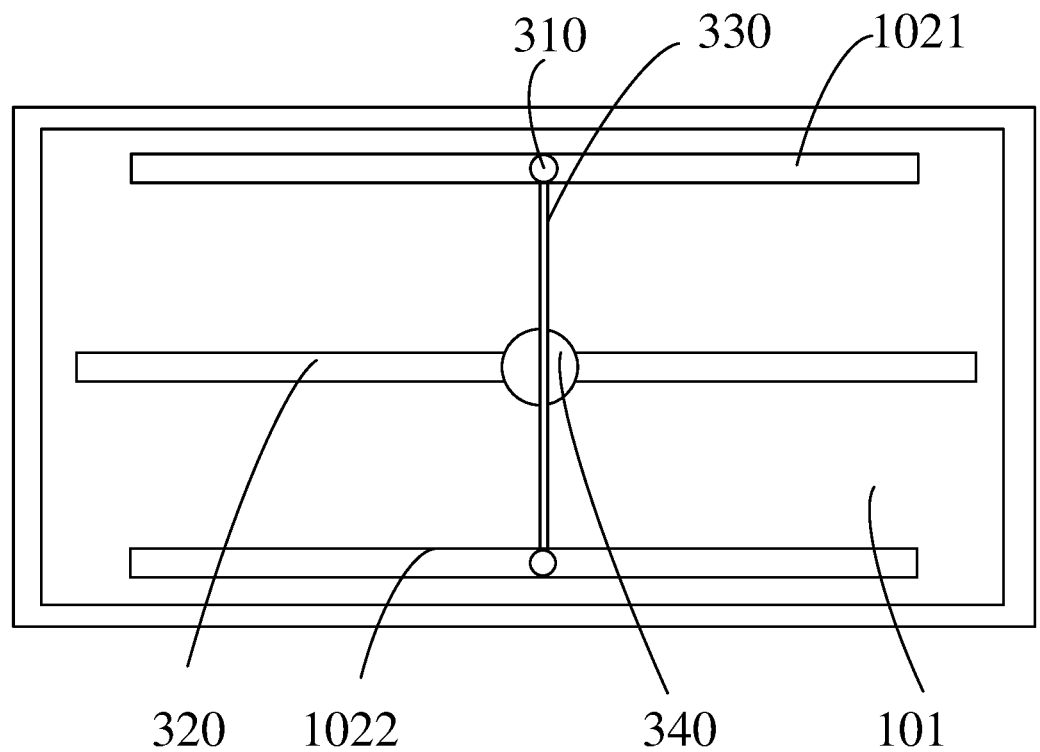
FIG. 11 is a plan structural view of a second embodiment of a display device according to an embodiment of the present disclosure.

Referring to FIG. 11, the present disclosure further provides a second implementation of the display device 1. The difference of the display device 1 of FIGS. 2 to 10 and the display device 1 of FIG. 11 mainly lies in that the planar shapes of the imaging area 102 are different. Specifically, in the present embodiment, the imaging area 102 includes a first imaging area 1021 and a second imaging area 1022 that are independent of each other. The planar shapes of the first imaging area 1021 and the second imaging area 1022 are rectangular. The first imaging area 1021 and the second imaging area 1022 are disposed in parallel and spaced apart from each other. More specifically, the first imaging area 1021 and the second imaging area 1022 extend along the length direction of the display panel 100, and are spaced along the width direction of the display panel 100.

Accordingly, the seal ring 140 includes a first seal ring disposed along the peripheral edge of the first imaging area 1021 and a second seal ring disposed along the peripheral edge of the second imaging area 1022. In this case, the planar shapes of the first seal ring and the second seal ring are rectangular. In this case, the two imaging elements 310 correspond to the first imaging area 1021 and the second imaging area 1022, respectively. In this case, the target trajectories of the two imaging elements 310 are straight lines.

Figure 12:
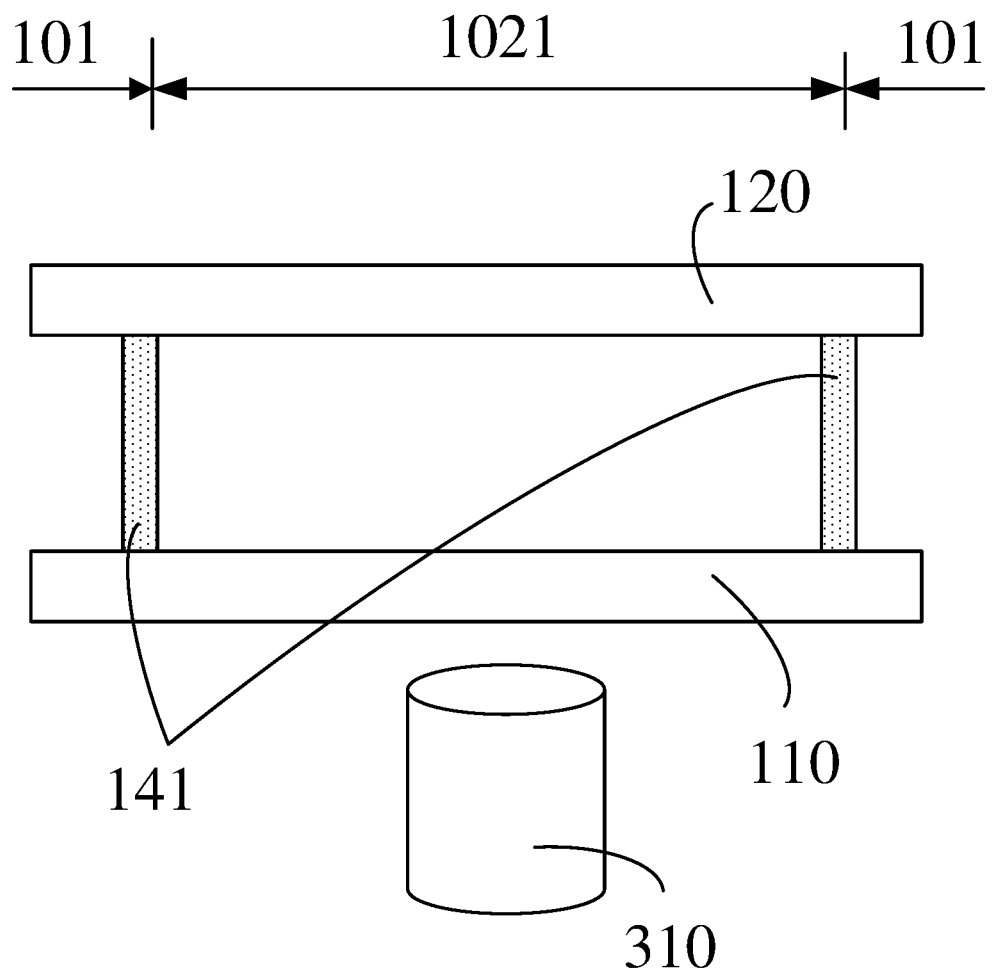
FIG. 12 is a cross-sectional view of an imaging area of a display panel, mainly showing a film layer structure of the display panel in the imaging area.

Referring to FIG. 12, further, in the present embodiment, the first imaging area 1021 and the second imaging area 1022 may be configured as non-display areas. Based on this, no second liquid crystal layer is disposed in the first imaging area 1021 and the second imaging area 1022. With this arrangement, the light incident effect of the imaging area 102 may be improved, and the imaging effect may be improved.

It is to be understood that equivalent substitutions or changes may be made in accordance with the technical solutions and inventive concept of the present disclosure for a person of ordinary skill in the art, and all such changes or substitutions shall fall within the scope of the claims appended to the present application.

What is claimed is:

1. A display device comprising:
   a display panel having an imaging area and a display area, wherein the imaging area has a continuously annular shape, the display area is divided into a first display area and a second display area independent of each other by the imaging area, the first display area surrounds a periphery of the imaging area and is adjacent to the imaging area, and the imaging area surrounds a periphery of the second display area and is adjacent to the second display area; and,
   an imaging module located on a non-display side of the display panel and comprising an imaging element and a driving mechanism, wherein the driving mechanism comprises a linear shaped holder, the imaging element is disposed at an end of the linear shaped holder, and the imaging element together with the end of the linear shaped holder is circumferentially movable in the continuously annular shape of the imaging area.

2. The display device according to claim 1, wherein the display device further comprises a backlight module located on the non-display side of the display panel, and an accommodating groove is formed on the backlight module at a position corresponding to the imaging area and opens to the imaging module; and
   wherein the imaging module is disposed so that all or a part of the imaging element is located in the accommodating groove, and the imaging module is capable of driving the imaging element to move relative to the accommodating groove.

3. The display device according to claim 2, wherein the backlight module comprises:
   a back plate having a first hollowed-out structure;
   a support bracket surrounding a periphery of the back plate;
   an optical module stacked on a side of the back plate facing the display panel, wherein a second hollow structure is formed on the optical module at a position corresponding to the first hollow structure; and
   a limiting side plate penetrating the first hollow structure and the second hollow structure along a thickness direction of the backlight module, wherein the limiting side plate is disposed along a peripheral edge of the first hollow structure and fixedly connected with the back plate, and the limiting side plate surrounds the accommodating groove.

4. The display device according to claim 3, wherein the backlight module further comprises a limiting element, and the limiting element is located between the optical module and the display panel and spans a side of the limiting side plate away from the back plate.

5. The display device according to claim 2, wherein the backlight module comprises:
   a back plate having a first hollow structure;
   a support bracket surrounding a periphery of the back plate;
   an optical module stacked on a side of the back plate facing the display panel, wherein a second hollow structure is formed on the optical module at a position corresponding to the first hollow structure, and the accommodating groove is constituted by the first hollow structure and the second hollow structure; and
   a positioning member disposed between the optical module and the display panel and simultaneously contacting the optical module and the display panel, wherein the positioning member is disposed along a peripheral edge of the second hollow structure.

6. The display device according to claim 2, further comprising a rear housing disposed on a side of the imaging module away from the display panel;
   the driving mechanism comprises a motor, and another holder, wherein:
   the motor is fixedly mounted via the another holder on a side of the backlight module away from the display panel or on the rear housing; and
   the linear shaped holder is mounted on the motor, and the motor drives the imaging element to move in the accommodating groove via the linear shaped holder.

7. The display device according to claim 1, wherein the imaging area has a first imaging area and a second imaging area spaced from each other.

8. The display device according to claim 1, wherein the display panel comprises an array substrate, an opposing substrate, a seal ring, a frame, a first liquid crystal layer, and a second liquid crystal layer, wherein:
   the opposing substrate is disposed opposite to the array substrate;
   the frame is disposed along a peripheral edge of the array substrate, and seals and connects the array substrate and the opposing substrate;
   the seal ring is disposed along a peripheral edge of the imaging area and located between the array substrate and the opposing substrate; the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area;
   the first liquid crystal layer is filled in the first sealed space; and
   the second liquid crystal layer is filled in the second sealed space.

9. The display device according to claim 1, wherein the display panel comprises an array substrate, an opposing substrate, a seal ring, a frame, and a first liquid crystal layer, wherein:
   the opposing substrate is disposed opposite to the array substrate;
   the frame is disposed along a peripheral edge of the display panel, and seals and connects the array substrate and the opposing substrate;
   the seal ring is disposed along a peripheral edge of the imaging area and located between the array substrate and the opposing substrate; the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area; and the first liquid crystal layer is filled in the first sealed space.

10. The display device according to claim 1, wherein the display device comprises an imaging control unit, wherein the imaging control unit is connected to the imaging element and the driving mechanism, the imaging control unit is capable of controlling the imaging element to sense an external environment of the display device, and transmitting a control signal to the driving mechanism in accordance with a sensed signal from the imaging element, and the driving mechanism is capable of adjusting a position of the imaging element in accordance with the control signal.

11. A display device comprising:
a display panel having an imaging area and a display area, wherein the imaging area has a continuously annular shape, the display area is divided into a first display area and a second display area independent of each other by the imaging area, the first display area surrounds a periphery of the imaging area and is adjacent to the imaging area, and the imaging area surrounds a periphery of the second display area and is adjacent to the second display area;
a backlight module located on a non-light emitting side of the display panel, wherein an accommodating groove is formed on the backlight module, and an orthographic projection of the accommodating groove on the display panel corresponds to the imaging area; and
an imaging module comprising an imaging element and a driving mechanism, wherein the driving mechanism is located on a side of the backlight module away from the display panel and comprises a linear shaped holder, the imaging element is disposed at an end of the linear shaped holder and is received in the accommodating groove, and the imaging element together with the end of the linear shaped holder is circumferentially movable in the continuously annular shape of the imaging area.

12. The display device according to claim 11, wherein the backlight module comprises:
a back plate having a first hollow structure;
an optical module stacked on a side of the back plate facing the display panel, wherein a second hollow structure is formed on the optical module at a position corresponding to the first hollow structure; and
a limiting side plate penetrating the first hollow structure and the second hollow structure along a thickness direction of the backlight module, wherein the limiting side plate is disposed along a peripheral edge of the first hollow structure and fixedly connected with the back plate, and the limiting side plate surrounds the accommodating groove.

13. The display device according to claim 12, wherein the backlight module further comprises a limiting element, and the limiting element is located between the optical module and the display panel and spans a side of the limiting side plate away from the back plate.

14. The display device according to claim 12, further comprising a rear housing disposed on a side of the imaging module away from the display panel;
the driving mechanism comprises a motor, a first and another holder, wherein:
the motor is fixedly mounted via the another holder on a side of the backlight module away from the display panel or on the rear housing; and
the linear shaped holder is mounted on the motor, and the motor drives the imaging element to move in the accommodating groove via the linear shaped holder.

15. The display device according to claim 11, wherein the backlight module comprises:
a back plate having a first hollow structure;
an optical module stacked on a side of the back plate facing the display panel, wherein a second hollow structure is formed on the optical module at a position corresponding to the first hollow structure, and the accommodating groove is constituted by the first hollow structure and the second hollow structure; and
a positioning member disposed between the optical module and the display panel and simultaneously contacting the optical module and the display panel, wherein the positioning member is disposed along a peripheral edge of the second hollow structure.

16. The display device according to claim 11, wherein the imaging area comprises a first imaging area and a second imaging area, the first imaging area and the second imaging area are spaced from each other.

17. The display device according to claim 11, wherein the display panel comprises an array substrate, an opposing substrate, a seal ring, a frame, a first liquid crystal layer, and a second liquid crystal layer, wherein:
the opposing substrate is disposed opposite to the array substrate;
the frame is disposed along a peripheral edge of the array substrate, and seals and connects the array substrate and the opposing substrate;
the seal ring is disposed along a peripheral edge of the imaging area and located between the array substrate and the opposing substrate; the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area;
the first liquid crystal layer is filled in the first sealed space; and
the second liquid crystal layer is filled in the second sealed space.

18. The display device according to claim 11, wherein the display panel comprises an array substrate, an opposing substrate, a seal ring, a frame, and a first liquid crystal layer, wherein:
the opposing substrate is disposed opposite to the array substrate;
the frame is disposed along a peripheral edge of the display panel, and seals and connects the array substrate and the opposing substrate;
the seal ring is disposed along a peripheral edge of the imaging area and located between the array substrate and the opposing substrate; the seal ring, the frame, the array substrate and the opposing substrate surround to form a first sealed space corresponding to the display area; the seal ring seals and connects the array substrate and the opposing substrate, and the seal ring, the array substrate and the opposing substrate surround to form a second sealed space corresponding to the imaging area; and
the first liquid crystal layer is filled in the first sealed space.

19. The display device according to claim 11, wherein the display device comprises an imaging control unit, wherein the imaging control unit is connected to the imaging element and the driving mechanism, the imaging control unit is capable of controlling the imaging element to sense an external environment of the display device, and transmitting a control signal to the driving mechanism in accordance with a sensed signal from the imaging element, and the driving mechanism is capable of adjusting a position of the imaging element in accordance with the control signal.

20. The display device according to claim 11, wherein when the imaging area is in a display state, the imaging area and the display area form a continuous display functional area, and the imaging element is in any position of a circumference of the imaging area.

* * * * *